United States Patent [19]

Divisek et al.

[11] 4,445,994
[45] May 1, 1984

[54] ELECTROLYZER FOR ALKALINE WATER ELECTROLYSIS

[75] Inventors: Jiri Divisek; Heinz Schmitz, both of Julich, Fed. Rep. of Germany

[73] Assignee: Kernforschungsanlage Julich GmbH, Fed. Rep. of Germany

[21] Appl. No.: 351,408

[22] Filed: Feb. 23, 1982

[30] Foreign Application Priority Data

Mar. 5, 1981 [DE] Fed. Rep. of Germany ....... 3108255

[51] Int. Cl.³ .................. C25B 9/00; C25B 11/03; C25B 11/06; C25B 13/04
[52] U.S. Cl. .................. 204/258; 204/266; 204/283; 204/284; 204/286; 204/290 R; 204/292; 204/295
[58] Field of Search ........ 204/283, 282, 252, 255–258, 204/263–266, 286–288, 2.1; 284, 290 R, 292, 295; 429/41, 44

[56] References Cited

U.S. PATENT DOCUMENTS

| 1,388,754 | 8/1921 | Pechkranz | 204/295 X |
| 3,471,336 | 10/1969 | Sturm et al. | 204/2.1 |
| 3,554,812 | 1/1971 | Sturm et al. | 429/44 X |
| 3,607,411 | 9/1971 | Brownrigg | 204/290 R X |
| 4,225,411 | 9/1980 | Grüne | 204/286 |
| 4,312,736 | 1/1982 | Menth et al. | 204/255 |
| 4,331,523 | 5/1982 | Kawasaki | 204/283 X |

FOREIGN PATENT DOCUMENTS 2927566  1/1981  Fed. Rep. of Germany ...... 204/295

Primary Examiner—Donald R. Valentine
Attorney, Agent, or Firm—Omri M. Behr

[57] ABSTRACT

The invention concerns an electrolyzer for alkaline water electrolysis whose cells are formed by a diaphragm provided with electrodes between 2 bi-polar separator plates as well as a process for the construction thereof.

11 Claims, 5 Drawing Figures

ELECTROLYZER FOR ALKALINE WATER ELECTROLYSIS

BACKGROUND OF THE INVENTION

A well developed technology exists for the purpose of hydrogen formation by means of the electrolysis of water, which is a useful and commercially viable approach investigated throughout the World.

The electrolyzers used therefor are generally constructed in the form of bi-polar units. The working potential of such cells generally speaking lies in the area of 1.8 to 2 volts having a relatively low current density of between 200 to 300 mA/cm$^2$. The efficiency of such cells is therefore very poor calculated on the reaction enthalpy. For achievement of a 100% yield at economically feasible current densities the total cell potential should be of the order of 1.5 volts. The achievement of this goal is the stated purpose of all commercially viable developments in the field of alkaline water electrolysis.

The greatest problems standing in the way of the achievement of this goal are as follows:

1. An excessively low working temperature for the water electrolyzer. This temperature requirement is determined by the use of the generally employed asbestos diaphragm which is only stable at low temperatures.
2. An insufficient activity of the electrodes and,
3. An unsatisfactory cell construction mode which does not employ the advantages of individual, newly developed, cell components (i.e. active electrodes, diaphrams and the like) to an optimal extent.

Heretofore two principal types of electrolysis cells were known. The most frequently utilized cell construction is based on the concept of Zdansky Lobza (see Lurgi Express Information T1084/6.73) which comprises a cell of the following construction elements:

There are provided two electrodes of nickel netting or perforated sheet placed in a sandwich like manner around a central asbestos diaphragm. This sandwich is placed between a pair of bi-poplar plates in the form of a waffle sheet metal plates whose egg shaped protrusions stand in pressure contact with the electrodes. The sandwich like construction of the electrodes minimizes the electrode distances so that the ohmic potential drop in the electroyltes can be substantially eliminated.

This substantially optimal cell concept does not however, meet the criteria of points 1 and 2 above that is to say, that the net electrodes do not possess a sufficiently satisfactory electro-chemical activity and the asbestos diaphragms prohibit higher working temperatures.

Practically all of the known suggestions for raising the electrode activity are based upon an increase in the surface area of the electrodes by means of a catalytically active porous layer having an increased internal surface area. When such porous electrodes prepared in accordance with the above described construction principles, are combined with bi-polar plates through pressure contact, oxide layer formation particularly on the anode side, gives rise to such high contact resistance that the gains achieved by activation are lost by reduction of the potential through ohmic potential drop at these contact points.

On the other hand, another form of cell construction which comprises an active electrode layer on the bi-polar plates themselves in order to avoid these losses, gives rise to new ohmic potential drops in the electrolyte space between the electrodes and the diaphragm which is filled by the gas produced. This serious problem has been well described in the work entitled "Improvements in Electrolysis Technology in Alkaline Solutions" by Appleby and Crepy (Proceedings of the Second World Hydrogen Energy Conference, Zurich 1978, pages 227-240 in particular section 5).

In this case the problem may be avoided by the introduction of the so called pre-electrodes which are formed out of electro-catalytically surfaced perforated metal, for example, expanded metal (see with Krebskosmo Information No. 5-Water Electrolysis-FIG. 4 and text). There pre-electrodes made of expanded metal, are rigidly connected to the bi-polar plates by spot welding so that no contact losses can occur. However, even in this case there are substantial potential losses caused by solution resistance.

A complete solution to both problems would be offered by an activated porous electrode which is rigidly connected, without pressure contact with the bi-polar plate said electrodes lying sandwich like upon the separator without any space there between. Heretofore this idea has not been technically realized since no simple and commercially viable made of reducing this theory to practice had yet been found.

SUMMARY OF THE INVENTION

The purpose of the present invention is to provide an electrolyzer for alkaline water electrolysis which may be readily produced and which has commercial viability combined with a long working life.

The invention provides an electrolyzer constituting an improvement over the known technology characterized thereby that it comprises electrodes, lying sandwich like upon the diaphragm, which are formed by a fine metallic net filled with active porous nickel which coats its entire surface. These electrode nets are along the whole surface area repeatingly electrically connected with, especially welded to, structurally supporting, electrically conductive, support elements which permit not only the evolution of gas, but its removal from the vicinity of the electrode as well.

The fine metal mesh utilized for the anode is suitably a nickel or nickel plated mesh while at the cathode side an iron or steel mesh can suitably be used as well.

In such an arrangement the electrically conductive support elements, which are electrically connected with the electrode net, serve to provide a uniform distribution of potential over the entire electrode, while the filling of the lattice with active porous nickel, prevents over-potentials. In this manner production scale efficiency could be obtained which otherwise could only be achieved in laboratory scale arrangements.

DETAILED DESCRIPTION OF THE DRAWINGS

Figure 1:
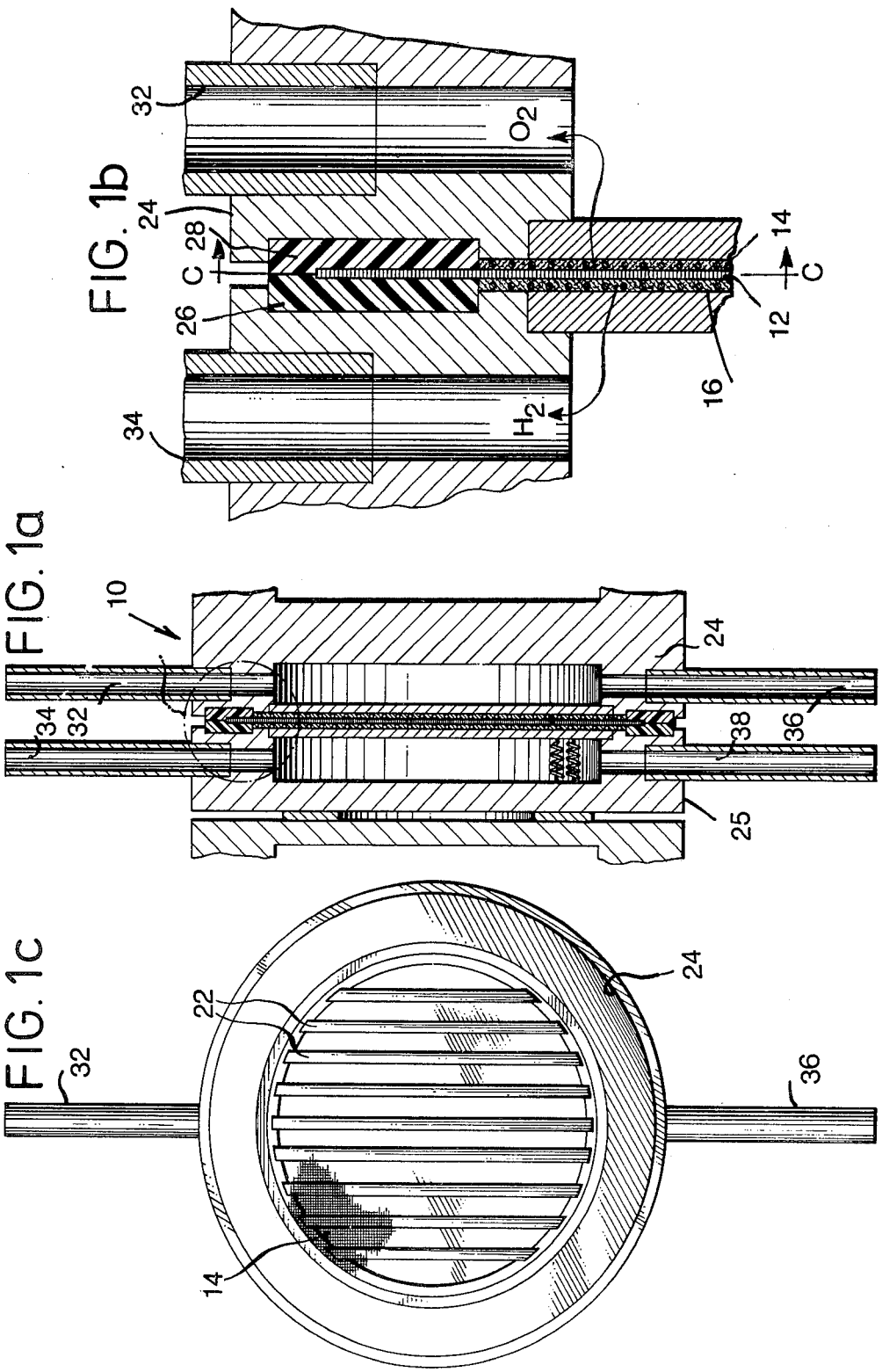
FIG. 1a is an elevational cross sectional view of an electrolysis cell of the present invention.
FIG. 1b is an exploded view of a portion of FIG. 1a as indicated.
FIG. 1c is a partial side elevational view of a portion of the cell of FIG. 1a viewed at c—c, namely the mesh, support elements, the support plates, and the ingress and egress tubes.

The basic cell unit 10 is illustrated in FIG. 1a. The unit comprises a diaphragm 12 having a fine first mesh 14 disposed on one side thereof and a fine metallic mesh 16 disposed on the other side thereof, said meshes 14 and 16 being in intimate contact with diaphragm 12 but not in contact with each other. The intersticies of said meshes are filled with porous active nickel. On the side of meshes 14 and 16 respectively not in contact with diaphragm 12 is, each case, welded a lattice comprising support elements 22 which are not only in physical connection with said meshes but in view of said welds in electrical contact therewith as well. The support elements are so disposed that when the cell is in operation said elements are parallel to the direction of flow of the gas generated from each said respective mesh. Electrically conductive support plate 24 is provided to the side of diaphragm 12 covered by mesh 14 and support elements 22 and similarly electrically conductive support plate 25 are provided to the side of the diaphragm 12 carrying mesh 16 and support elements 23. The size of the two meshes is provided to be somewhat less than the size of the diaphragm. Insulating segments 26 and 28 surround that portion of the diaphragm not in contact with the meshes thus no short-circuit between the two bi-polar plates is possible. Support plate 24 is disposed to be in physical contact with insulating segment 28 and in physical and electrical contact with mesh 14 and support elements 22. Similarly support plate 25 is in physical contact with separating element 26 and in physical and electrical contact with mesh 16 and support elements 23. Means are provided to hold all elements in close contact. Electrical contact means (not shown) are provided to support plates 24 and 25 respectively. Ingress tube 36 for the ingress of fresh electrolyte and egress tube 32 for the egress of electrolyte and gaseous product are provided through support plate 24, similarly ingress tube 38 and egress tube 34 for the same purpose are provided through support plate 25.

In operation of the device where a positive potential is applied to support plate 24 and a negative potential to support plate 25, oxygen is generated by mesh 14 and passes through egress tube 32 and similarly hydrogen is generated at mesh 16 and passes through tube 34 when a suitable alkaline electrolyte is supplied to ingress tubes 36 and 38 respectively. In spite of these tubes (32, 34, 36, 38) channels traversing the series of cells could be provided in a known manner.

The separator plates 25 illustrated on the left side of FIG. 1a as subdivided between adjacent cells could be provided alternatively undivided in one piece belonging to both cells as shown on the right side of FIG. 1a.

When realizing large Electrolysors having electrodes pressed against the diaphragm spring elements 9 as shown at the left bottom side of FIG. 1a should be provided distributed over the area between the separator plates 24, 25 and the support elements 14, 16.

The diaphragm 12 for the passage there through of ions is relatively thin, suitably of the order of about 0.5 millimeters and thus provides relatively small resistance.

The illustrated cell construction is complete in itself, but may if desired be mechanically and/or electrically connected with neighboring separate cells provide the possibility of ready replacement of individual cells without the need for sacrificing the operative unity of the various component units of the electrolyzer during this exchange.

It is preferred that the supporting elements 22 and 23 are formed either by a lattice of rods oriented parallel to the gas evolution direction and which, are spot welded to the metallic electrode mesh 14 and 16 over their entire surface or by a correspondingly welded expanded metal element. Preferably the lattice rods have a diameter of the order of 1 to 3 mm and a mutual spacing of the order of 4 to 8 mm.

It is particularly desirable to provide an optimal orientation of the individual elements of the cell to each other. This may be provided by the use of the finest possible electrode layer comprising an iron or nickel mesh and a porous nickel layer as well as the selection of appropriate diameters for the rod formed support elements and the predetermined separation between these as well as the appropriate sequence of spot welds to provide the physical and electrical connection between the metal mesh net and the support elements. It is especially preferred to provide a metal mesh net of wire thickness of from about 0.1 to about 0.2 millimeters, and a mesh width of between about 0.2 and about 0.3 millimeters. The coating of this metal mesh with active nickel, which may desirably be achieved through flame or plasma spraying of a Raney nickel layer, which, if desired may be additionally consolidated by galvanic nickel/zinc precipitation followed by activation by treatment with an alkaline leaching, has, suitably, a layer thickness of about 0.2 millimeters. The separation of the spot welds lies suitably between about 0.1 and about 1 centimeters, preferably between about 1 and about 2 millimeters. Modifications and further individual aspects of the formation of suitable electrode layers may be found in German published application DE-OS No. 2914094 of applicants assignee.

Particularly suitable as diaphragms may be mentioned nickel oxide diaphragms which have been developed by applicants assignee and disclosed in German published application DE-OS No. 3031064.

Electrode layers formed by galvanic precipitation of nickel/zinc, in particular upon a porous sinter layer followed by removal of the zinc by dissolution, have particularly desirable qualities because their galvanically consolidated structure comprise macropores and micropores. Thus, the macropores are substantially determined by the particle sizes of the powders used for the formation of the body of the sinter while the microporosity is achieved by the dissolution of the zinc from the nickel/zinc precipitate.

The macroporosity should be related to the rate of gas evolution of the electrode. Thus, the pore size should be generally speaking lie in the area of between 10 to 100 micrometers.

The diaphragm on the other hand ought to have a porosity which is less than the foregoing by a factor of at least one order of magnitude but under no circumstances should it be greater than 10 micrometers. It has been found suitable to employ a diaphragm with a mean porosity of about 2 micrometers whose individual pore diameters lies between about 0.7 and about 3 to about 4 micrometers. Preferably diaphragms are employed which have a mean pore size in the area of from about 0.5 to about 5 micrometers, preferably having pores of between about 1 and about 2 micrometers.

As carrier for the porous electrode layer a metal mesh may be utilized as mentioned. A nickel mesh or an iron or steel mesh is suitably used on the cathode side whereas on the anode side a nickel or nickel plated net may be utilized. Similarly, in the conventional manner the porous electrode layer may contain, in addition to nickel, catalytically acting other material in particular cobalt, lanthanum or strontium.

In accordance with yet a further embodiment of the method of forming the electrode layers it is possible to compress a mixture of Raney nickel powder mixed with methyl cellulose into a carrier mesh, and to activate this precursor after a sintering treatment by treatment with alkali.

The production of the diaphragms provided with electrodes and support elements is set forth in the following examples.

EXAMPLES

EXAMPLE I

A nickel oxide diaphragm is prepared in accordance with the procedures set forth in German published application DE-OS 3031064. A fine nickel mesh is layed upon both sides of the diaphragm, having a rod lattice spot welded on the side thereof away from the diaphragm. This arrangement is then provided with a Raney nickel layer by flame spraying. During this deposition an appropriate coating behind the lattice rods is aimed at. According an even more prefered variation the diaphragm is additionally provided at first with a slight coating of flame sprayed porous nickel layer (of about 10 to 50 $\mu$m thickness. The Raney nickel layer is reinforced by electrochemical deposition of nickel/zinc and the arrangement is activated in the usual manner by treatment with an alkaline solution. The bi-polar end plates are then electro conductively connected with the lattice rods.

EXAMPLE II

One side of the rod lattice, similar to that in Example I, is spot welded to a nickel mesh, the other side of said lattice is rigidly welded to a half-cell forming bi-polar end plate. The mesh is coated with Raney nickel layer by flame spray and provided with a nickel/zinc coating by electrochemical deposition. After activation by aqueous alkali in the known manner this arrangement is placed on both sides of a central nickel oxide diaphragm.

In place of the nickel oxide diaphragm in accordance with this example, there may be similarly used other separators such as ion exchanging membranes. Among these separators may be named a polyantimony acid separator as disclosed by Vandenborre et al in "Seminar on hydrogen as an Energy Vector" EEC report EUR6085 Brussels 1978 page 161.

In both cases, that is to say, example I as well as example 2 there may be utilized as an activating layer for the metal mesh, in place of the combined Raney nickel/nickel-zinc precipitation either only raney nickel deposited by flame or plasma spray or only nickel/zinc by galvanic means. It is also possible to deposit carbonyl nickel by flame or plasma spray or else by rolling in and sintering, and additionally deposit galvanic nickel/zinc thereon. The most desirable (i.e. lowest) potential values are nevertheless obtained by the combined use of Raney nickel with nickel/zinc precipitation (and activation) as described in examples I and II.

COMPARATIVE EXAMPLES

Figure 2:
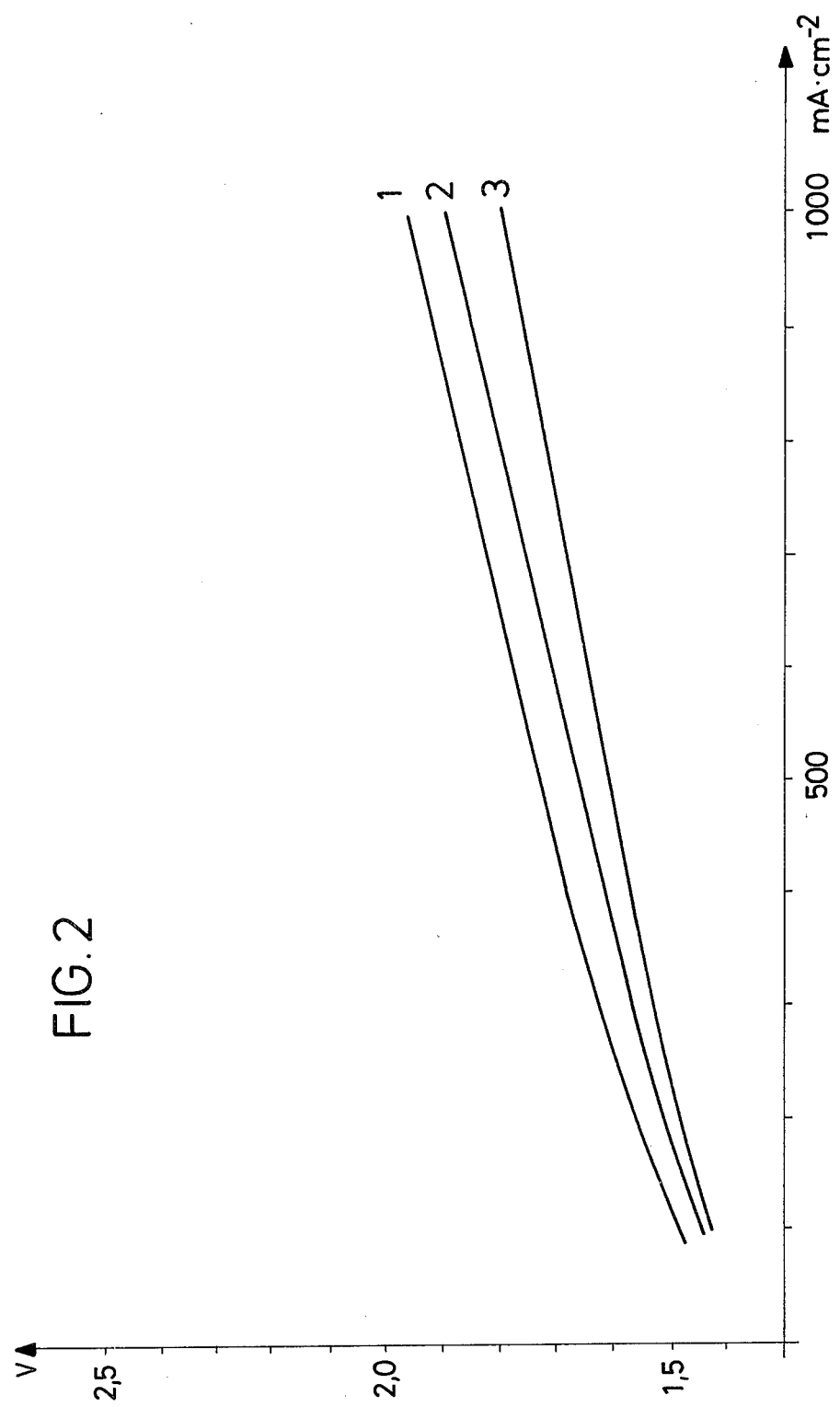
FIG. 2 shows plots of current density against voltage obtained by utilizing the apparatus of the present invention and utilizing two apparatuses of the prior art.

A nickel oxide diaphragm was coated on both sides with activated electrodes and, in accordance with example I provided between end plates wherein current contact with the electrodes is obtained by pressure contact with a laminar expanded metal element which was pressed between the end plates and the coated diaphragm. In this arrangement during the process of electrolysis, oxide layers are formed between the contact on the anode side which give rise to a substantial ohmic potential drop which requires a raising of the cell potential for the same current density. The potential/current density line is shown as curve 1 on FIG. 2.

Electrodes of known structure are prepared by the catalytic coating by deposit of Ni/Zn and leaching of Zn of expanded metal elements as electrodes welded to a bi-polar end plate. These are used for the construction of a cell in a sandwich arrangement. Even with this arrangement, in gas filled electrolytes, potential losses occur which require the increase of the cell potential. The curve obtained from this arrangement is shown as curve 2 in FIG. 2.

A third curve is provided by an arrangement produced in accordance with example II for water electrolysis at 100° C. in a 30% aqueous potassium hydroxide solution (conditions similar to those utilized in curves 1 and 2). In all three cases a catalytic coating of comparable quality is provided on the electrode and this quality determined by potential free measurements. It will be seen from FIG. 2 that curve 3 represents a substantial improvement over the situation in curves 1 and 2.

Figure 3:
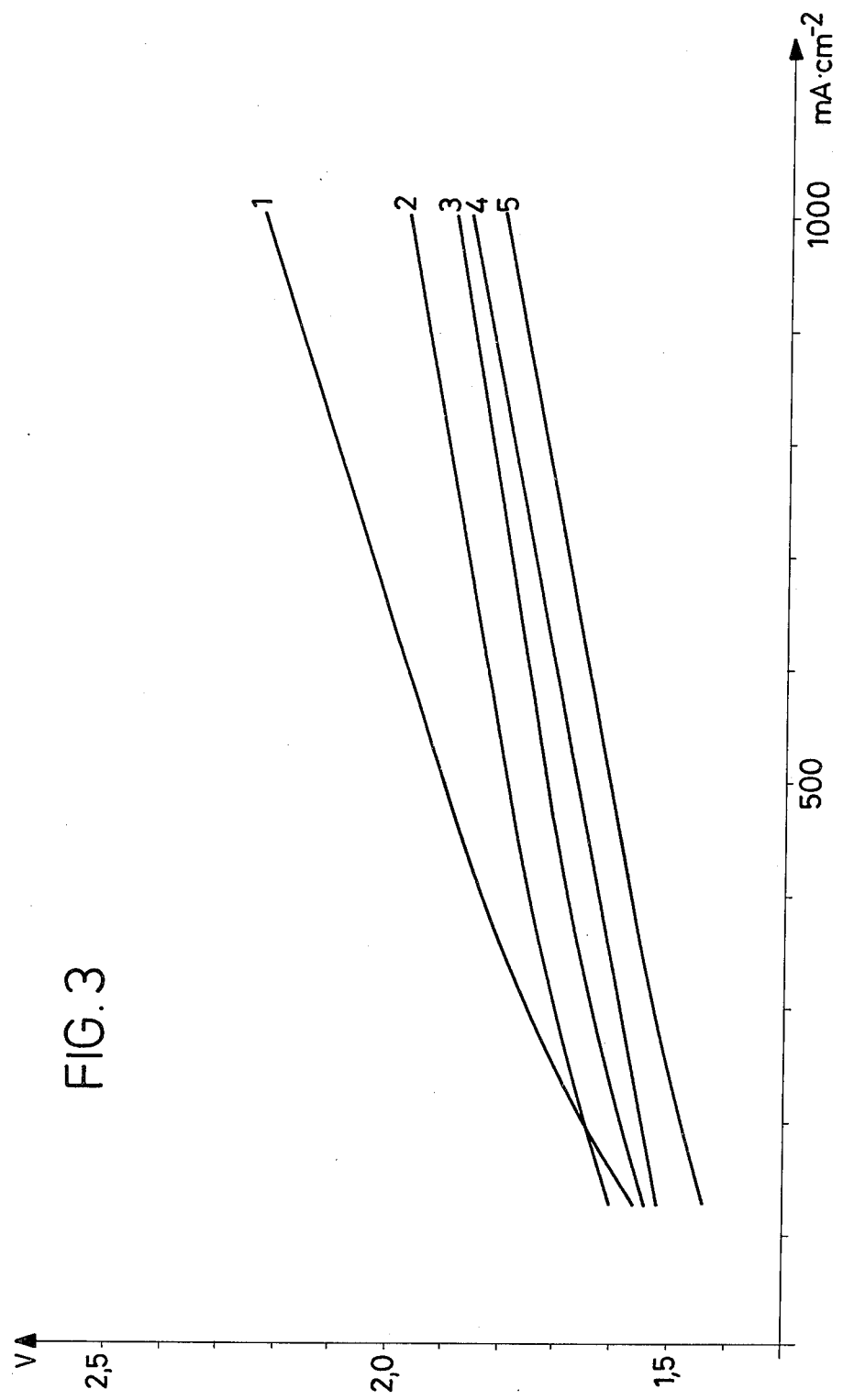
FIG. 3 shows the plot of current density against voltage for an apparatus in accordance with the present invention as compared to four other plots taken from the published literature.

In FIG. 3 a comparison was made of the results obtained utilizing apparatus in accordance with the present invention in comparison with other cells of other known types. All curves resulted from experiments run under substantially similar conditions of electrolysis that is to say, at a temperature of approximately 100° C. moderate pressure, and similar electrode size. The actual basis of these experiments found by various authors and the reaction conditions are set forth below.

Curve 1: N. Wakabayashi et al, Proc. 3rd World Hydrogen Energy Conf., Tokyo, 23.-26.1980,S.58 (Temp. 118° C., Electrode 50 cm$^2$).

Curve 2: H. Vandenborre et al, Seminar Hydrogen, Commission Europ.Comm., Brussels, 12.14.2. 1980, S.143 (Temp. 100° C., Electrode 40 cm$^2$, 3 bar).

Curve 3: J. N. Murray, M. R. Yaffe, Proc. 3rd.WHEC, Tikyo, 23.-26.6.1980, S.15 (Temp.100° C., Electrode 300 cm$^2$)

Curve 4: L. J. Nuttall, J. H. Russell, Int. J.Hydrogen Energy, 5,75 (1980). (SPE-Electrolysis Temp. 83° C., Electrode 45 cm$^2$, 7 bar)

Curve 5: Electrolysis cell in accordance with the present invention Identical with mit Curve 3, FIG. 2 (Temp. 100°; Electrode 30 cm$^2$; atmospheric pressure It will thus be seen that a considerable improvement is shown by Curve 5.

We claim:

1. An electrolysis cell component unit for alkaline water electrolysis to generate hydrogen and oxygen gases comprising:
   (a) A cathode portion and an anode portion, comprising a pair of electrically conductive separator plates,
   (b) insulating means, said insulating means being located between said separator plates to prevent direct electrical contact therebetween, (c) a porous diaphragm of electrically nonconductive material,
(d) a first metallic mesh and a second metallic mesh, said first metallic mesh being placed upon and in intimate contact with one side of said diaphragm and said second mesh being similarly placed upon the other side of said diaphragm, the interstices of both said meshes being filled with porous activated nickel,
(e) a first and a second lattice of rigid electrically conductive support elements said first lattice placed upon and over its whole surface being in repeating welded electro-conductive connection with said first metallic mesh, and said second lattice being similarly welded to and in electrically conductive relation with said second mesh, said cathode portion comprising one of said separator plates being in physical contact with a portion of said first mesh and a portion of said first lattice, said physical contact providing electrically conductive connection between the components of said cathode portion, said second lattice, said second mesh and said other separator plate comprising the anode portion being similarly in physical and electrically conductive contact with each other.

2. An electrolysis cell comprising at least one component unit of claim 1 and further comprising
(a) at least one ingress means on each side of the diaphragm of each of said component units for the provision of solution to be electrolyzed,
(b) at least one egress means for each side of the diaphragm of each of said component units for the egress of the gaseous product of the electrolysis,
(c) means for applying a positive potential to the electrically conductive separator plates designated for the anode side of the cell,
(d) means for applying a negative electro potential to the electrically conductive separator plates designated for the cathode side of the cell.

3. An electrolysis cell of claim 2 wherein the support elements of the lattice are oriented to be parallel to the direction of gas flow when the unit is in operation.

4. A composite electrolysis device comprising a series of self contained electrolysis cells of claim 2.

5. An electrolysis cell component unit of claim 1 wherein the support elements of the lattice are oriented to be parallel to the direction of gas flow when the unit is in operation.

6. A cell component unit of claim 1 wherein the diaphragm is nickel oxide diaphragm.

7. A cell component unit of claim 1 wherein said support elements have a diameter of from about 1 to about 3 millimeters and are separated from each other by a distance from about 4 to about 8 millimeters.

8. A cell component unit in accordance with claims 2 or 7 wherein the welded connection between said respective meshes and their respective support elements are located at a mutal distance of between 1 and 10 millimeters.

9. A cell component unit in accordance with claim 8 wherein the distance between said welded connections is between about 1 and about 2 millimeters.

10. A cell component unit of claim 1 wherein the material of said metallic meshes selected from the group consisting of nickel, nickel plated metals, iron, and steel.

11. An electrolysis cell component unit according to claim 1 comprising spring elements between the support member and the separator plate inside the cell space.

* * * * *